US010778812B1

(12) United States Patent
Kou et al.

(10) Patent No.: US 10,778,812 B1
(45) Date of Patent: Sep. 15, 2020

(54) DATA ENCAPSULATION CONVERSION AND TRANSMISSION

(71) Applicant: Alibaba Group Holding Limited, George Town (KY)

(72) Inventors: Guannan Kou, Hangzhou (CN); Lingtao Kong, Hangzhou (CN); Hongquan Zhang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/802,780

(22) Filed: Feb. 27, 2020

Related U.S. Application Data

(63) Continuation of application No. PCT/CN2020/070834, filed on Jan. 8, 2020.

(30) Foreign Application Priority Data

May 9, 2019 (CN) .......................... 2019 1 0383406

(51) Int. Cl.
*H04L 29/06* (2006.01)
*H04L 12/46* (2006.01)

(52) U.S. Cl.
CPC .......... *H04L 69/08* (2013.01); *H04L 12/4633* (2013.01); *H04L 69/165* (2013.01); *H04L 2212/00* (2013.01)

(58) Field of Classification Search
CPC ...................................................... H04L 69/08

(Continued)

(56) References Cited

U.S. PATENT DOCUMENTS 9,961,169 B1 * 5/2018 Koster .................. H04L 69/18
10,178,569 B1 * 1/2019 Colwell ................ H04W 24/08
(Continued)

FOREIGN PATENT DOCUMENTS

CN 106060179 10/2016
CN 207251670 4/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Peter G Solinsky
(74) *Attorney, Agent, or Firm* — Fish & Richardson P.C.

(57) ABSTRACT

A computer-implemented data transmission method includes: receiving, by a data transmission system, a data processing request sent by a first client deployed in a first region, in which the data processing request is encapsulated using a first data transmission protocol; converting an encapsulation protocol of the data processing request from the first data transmission protocol to a second data transmission protocol, to obtain a converted data processing request; transmitting the converted data processing request using a data transmission channel of the data transmission system, in which the data transmission channel supports the second data transmission protocol; at an output end of the data transmission channel, converting the encapsulation protocol of the converted data processing request from the second data transmission protocol to the first data transmission protocol, to obtain the data processing request; and transmitting the data processing request to a second client deployed in a second region.

18 Claims, 4 Drawing Sheets

(58) Field of Classification Search
USPC .......................................................... 370/466
See application file for complete search history.

(56) References Cited

U.S. PATENT DOCUMENTS

| | | | |
|---|---|---|---|
| 2003/0134590 | A1 | 7/2003 | Suda et al. |
| 2007/0014256 | A1* | 1/2007 | Le Faucheur ......... H04W 76/12 370/328 |
| 2015/0127853 | A1 | 5/2015 | Roskind et al. |
| 2018/0048567 | A1* | 2/2018 | Ignatchenko ....... H04L 43/0894 |
| 2019/0281364 | A1* | 9/2019 | Szabo .............. H04N 21/64769 |
| 2019/0320479 | A1* | 10/2019 | Choudhary ............. H04L 45/24 |
| 2020/0137021 | A1* | 4/2020 | Janakiraman ....... H04L 61/1511 |

FOREIGN PATENT DOCUMENTS

| | | |
|---|---|---|
| CN | 109150677 | 1/2019 |
| CN | 109218186 | 1/2019 |
| CN | 109525661 | 3/2019 |
| CN | 110213241 | 9/2019 |
| WO | WO 2019007209 | 1/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Appln. No. PCT/CN2020/070834, dated Mar. 23, 2020, 17 pages. (with partial English translation).

\* cited by examiner

DATA ENCAPSULATION CONVERSION AND TRANSMISSION

CROSS-REFERENCE TO RELATED APPLICATIONS

This application is a continuation of PCT Application No. PCT/CN2020/070834, filed on Jan. 8, 2020, which claims priority to Chinese Patent Application No. 201910383406.5, filed on May 9, 2019, and each application is hereby incorporated by reference in its entirety.

TECHNICAL FIELD

The present specification relates to the field of computer technologies, and in particular, to data transmission methods, equipments, media and devices.

BACKGROUND

With development of Internet technologies, more and more cross-border transactions occur by using Internet service platforms. For some services, a user request needs to be sent to a domestic server for processing. Therefore, in a process of transmitting the user request, cross-border or cross-continent transmission is required. For this situation, a data transmission method is urgently needed to effectively alleviate a data transmission efficiency problem between a client and a server that are located in different regions in a multinational transaction scenario.

SUMMARY

In view of this, implementations of the present specification provide data transmission methods, equipments, media and devices, so as to improve data transmission efficiency between clients and servers in different regions in a multinational transaction scenario.

The following technical solutions are used in the implementations of the present specification.

An implementation of the present specification provides a data transmission method, applied to a cross-border data transmission scenario, including: receiving a data processing request sent by a first equipment deployed in a first region, where the data processing request is obtained through encapsulation by using a first data transmission protocol; converting the encapsulation protocol of the data processing request from the first data transmission protocol to a second data transmission protocol based on different data transmission protocol conversion rules; and transmitting the converted data processing request by using a data transmission channel that supports the second data transmission protocol.

An implementation of the present specification further provides a data transmission system, applied to a cross-border data transmission scenario, including: a Quick User Datagram Protocol (UDP) Internet Connection (QUIC) client equipment, deployed in a first region and configured to receive a data processing request sent by a first equipment deployed in the first region, where the data processing request is obtained through encapsulation by using a first data transmission protocol, and convert the encapsulation protocol of the data processing request from the first data transmission protocol to a second data transmission protocol based on different data transmission protocol conversion rules; and a QUIC server equipment, deployed in a second region and configured to receive the converted data processing request by using a data transmission channel that is established with the QUIC client equipment and that supports the second data transmission protocol.

An implementation of the present specification provides a data transmission equipment, applied to a cross-border data transmission scenario, including: a receiving unit, configured to receive a data processing request sent by a first equipment deployed in a first region, where the data processing request is obtained through encapsulation by using a first data transmission protocol; a processing unit, configured to convert the encapsulation protocol of the data processing request from the first data transmission protocol to a second data transmission protocol based on different data transmission protocol conversion rules; and a transmission unit, configured to transmit the converted data processing request by using a data transmission channel that supports the second data transmission protocol.

An implementation of the present specification further provides a computer readable storage medium. The computer readable storage medium stores computer program instructions, and the previous method is implemented when the computer program instructions are executed by a processor.

An implementation of the present specification further provides a data processing device, including: at least one processor, at least one memory, and computer program instructions stored in the memory, where the previous method is implemented when the computer program instructions are executed by the processor.

The at least one technical solution used in the implementations of the present specification can achieve the following beneficial effects:

According to the technical solution provided in the implementations of the present specification, the data processing request sent by the first equipment deployed in the first region is received, where the data processing request is obtained through encapsulation by using the first data transmission protocol. The encapsulation protocol of the data processing request is converted from the first data transmission protocol to the second data transmission protocol based on different data transmission protocol conversion rules. The converted data processing request is transmitted by using the data transmission channel that supports the second data transmission protocol. An accelerated transmission mechanism is added to an existing data transmission mechanism. That is, for a data processing request transmitted by using a first encapsulation protocol, after data transmission protocol conversion is performed, transmission is performed by using a data transmission channel that supports a second encapsulation protocol, thereby effectively improving data transmission efficiency.

BRIEF DESCRIPTION OF DRAWINGS

The accompanying drawings described here are intended to provide a further understanding of the present specification and constitute a part of the present specification. The illustrative implementations of the present specification and descriptions thereof are intended to describe the present specification, and do not constitute limitations on the present specification. In the accompanying drawings.

DESCRIPTION OF IMPLEMENTATIONS

Figure 1:
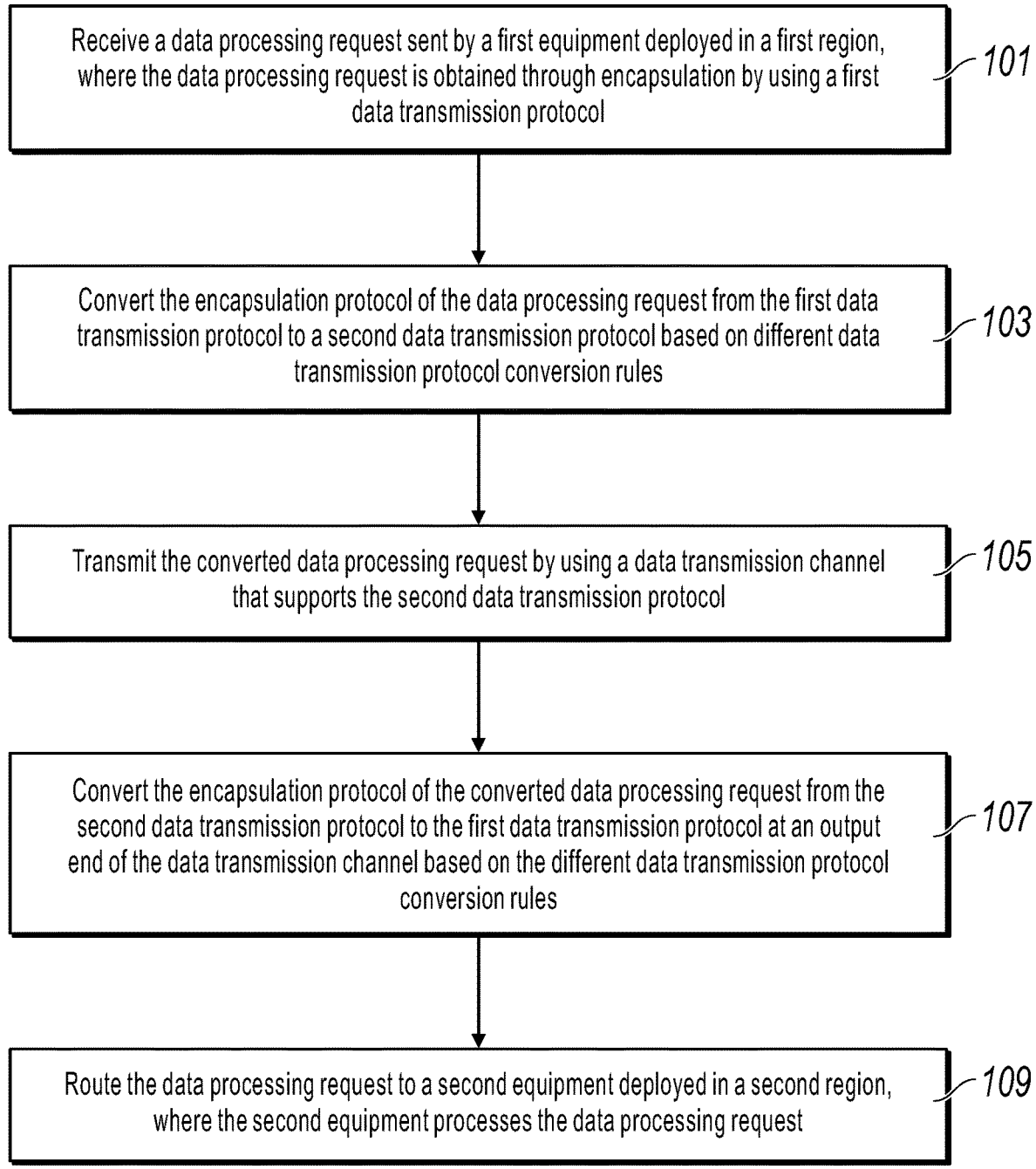
FIG. 1 is a schematic flowchart illustrating a data transmission method, according to an implementation of the present specification.

In a practical cross-country or cross-state data transmission process, usually there are cases such as "response time is too long due to a long link distance" and "link bandwidth utilization is low due to packet losses", which seriously affects service experience in a cross-country transaction scenario. To improve data transmission efficiency between clients and servers in different regions in a multinational transaction scenario, some processing solutions are provided, such as long connection transmission, dedicated line transmission, and TCP-based unilateral accelerated transmission.

Based on researches, some disadvantages are found in these processing solutions. For example, if a large number of long connections are maintained between different servers, the large number of long connections will occupy a large bandwidth based on transmission fairness specified in the TCP protocol. For another example, because a data transmission link is relatively long, the long connection has high maintenance costs and poor effects, and connection stability is not good.

To alleviate the problem described in the present specification and achieve the objective of the present specification, implementations of the present specification provide a data transmission method, equipment, medium and device. A data processing request sent by a first equipment deployed in a first region is received, where the data processing request is obtained through encapsulation by using a first data transmission protocol. The encapsulation protocol of the data processing request is converted from the first data transmission protocol to a second data transmission protocol based on different data transmission protocol conversion rules. The converted data processing request is transmitted by using a data transmission channel that supports the second data transmission protocol. An accelerated transmission mechanism is added to an existing data transmission mechanism. That is, for a data processing request transmitted by using a first encapsulation protocol, after data transmission protocol conversion is performed, transmission is performed by using a data transmission channel that supports a second encapsulation protocol, thereby effectively improving data transmission efficiency.

It is worthwhile to note that "first" and "second" in the "first data transmission protocol" and "the second data transmission protocol" recorded in the implementations of the present specification have no special meaning, and refer to only different data transmission protocols. The second data transmission protocol described here can be an advanced version of the first data transmission protocol, or in terms of data transmission performance or protocol characteristics, the second data transmission protocol is superior to the first data transmission protocol.

For example, the first data transmission protocol in the implementations of the present specification can be the Transmission Control Protocol/Transport Layer Security (TCP/TLS) protocol, and the second data transmission protocol can be the QUIC protocol.

The following clearly and comprehensively describes the technical solutions in the present specification with reference to the specific implementations of the present specification and the corresponding accompanying drawings. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

FIG. 1 is a schematic flowchart illustrating a data transmission method, according to an implementation of the present specification. The method can be described as follows. The execution body of this implementation of the present specification can be a network system used to process cross-border data transmission, or can be multiple equipments used to process cross-border data transmission. A form of the execution body is not specifically limited here.

Step 101: Receive a data processing request sent by a first equipment deployed in a first region, where the data processing request is obtained through encapsulation by using a first data transmission protocol.

In the implementation of the present specification, the first equipment is deployed in the first region, and a user sends a data processing request to the first equipment by using a client equipment. The data processing request is obtained through encapsulation by using a first data encapsulation protocol.

When receiving the data processing request, the first equipment determines, based on a routing address included in the data processing request, whether the data processing request needs to be routed to a second device in a second region; and if the data processing request needs to be routed to the second equipment in the second region, sends the data processing request to the execution body of the technical solution described in the implementation of the present specification; or if the data processing request does not need to be routed to the second device in the second region, routes the data processing request to another equipment deployed in the first region.

"First" and "second" in "the first region" and "the second region" recorded in the implementation of the present specification have no special meaning, and represent only different regions. The definition of different regions here can be understood as different zones or different areas, or can be understood as a distance between two locations is greater than a specified value, which is not specifically limited here. In the implementation of the present specification, a region division rule is preferably on a country basis, and different regions are understood as different countries.

Step 103: Convert the encapsulation protocol of the data processing request from the first data transmission protocol to a second data transmission protocol based on different data transmission protocol conversion rules.

In the implementation of the present specification, "different data transmission protocol conversion rules" can be understood as converting a message encapsulated by using protocol A into a message encapsulated by using protocol B. In different data transmission networks, different data transmission protocols are used for data transmission. Assume that data transmission network a and data transmission network b exist, it means that data transmission in data transmission network a needs to use protocol A; data transmission in data transmission network b needs to use protocol B. If data encapsulated by using protocol B is transmitted to data transmission network a, data transmission network a cannot correctly identify the data. Similarly, if data encapsulated by using protocol A is transmitted to data transmission network b, data transmission network b still cannot correctly identify the data.

To accelerate data transmission efficiency in data transmission network a, data transmission network b can be integrated into data transmission network a. As such, different data transmission protocols can be used on a data transmission link to accelerate data transmission efficiency.

Assume that data transmission network b can be considered as the execution body of the implementation of the present specification. Then, for the data processing request initiated by the user, after the data processing request is transmitted to the first equipment, the data processing request is transmitted to an input end of data transmission network b in the method described in step 101. In this case, data transmission network b converts the encapsulation protocol of the data processing request from the first data transmission protocol to the second data transmission protocol based on the different data transmission protocol conversion rules.

Specifically, first, the data processing request encapsulated by using the first data transmission protocol is decapsulated. Second, the second data transmission protocol is used to re-encapsulate the data processing request obtained by decapsulating, so as to convert the encapsulation protocol of the data processing request from the first data transmission protocol to the second data transmission protocol.

Preferably, in the implementation of the present specification, a data transmission conversion equipment can further be deployed between data link 1 that supports the first data transmission protocol and data link 2 that supports the second data transmission protocol. The data transmission conversion equipment serves as the execution body of the implementation of the present specification, and performs data transmission protocol conversion on the data processing request transmitted by using data link 1, so the converted data processing request (which supports the second data transmission protocol) is transmitted by using data link 2.

In the implementation of the present specification, the first data transmission protocol is the TCP/TLS protocol, and the second data transmission protocol is the QUIC protocol.

Step 105: Transmit the converted data processing request by using a data transmission channel that supports the second data transmission protocol.

In the implementation of the present specification, if the execution body of the implementation of the present specification is a network system used to process cross-border data transmission, the data transmission channel that supports the second data transmission protocol is established in the network system. The data transmission channel can be a long connection method, or can also be a data transmission channel that needs to be established in real time. However, compared with a data transmission channel that supports the first data transmission protocol, the data transmission channel that supports the second data transmission protocol consumes fewer network resources, and has a shorter data transmission delay. Therefore, when the converted data processing request is obtained, the converted data processing request can be transmitted by using the data transmission channel.

If the execution body of this implementation of the present specification is a data transmission conversion equipment, the data transmission conversion equipment sends the converted data processing request to a data transmission network that supports the second data transmission protocol, and transmits the converted data processing request by using a data link of the data transmission network.

Preferably, the converted data processing request is routed to a target equipment, and the target equipment processes the data processing request.

If the converted data processing request in the implementation of the present specification needs to be routed to the second equipment deployed in the second region, the method described in the implementation of the present specification further includes:

Step 107: Convert the encapsulation protocol of the converted data processing request from the second data transmission protocol to the first data transmission protocol at an output end of the data transmission channel based on the different data transmission protocol conversion rules.

In the implementation of the present specification, the encapsulation protocol of the converted data processing request is converted from the second data transmission protocol to the first data transmission protocol at the output end of the data transmission channel based on the different data transmission protocol conversion rules. That is, assume that the first data transmission protocol is the TCP/TLS protocol, and the second data transmission protocol is the QUIC protocol. In step 103, a data processing request message encapsulated by using the TCP/TLS protocol is converted into a data processing request message encapsulated by using the QUIC protocol. In step 107, the data processing request message encapsulated by using the QUIC protocol is converted into a data processing request message encapsulated by using the TCP/TLS protocol.

A conversion method is the same as that described in step 103, and details are omitted here for simplicity.

Step 109: Route the data processing request to a second equipment deployed in a second region, where the second equipment processes the data processing request.

Figure 2:
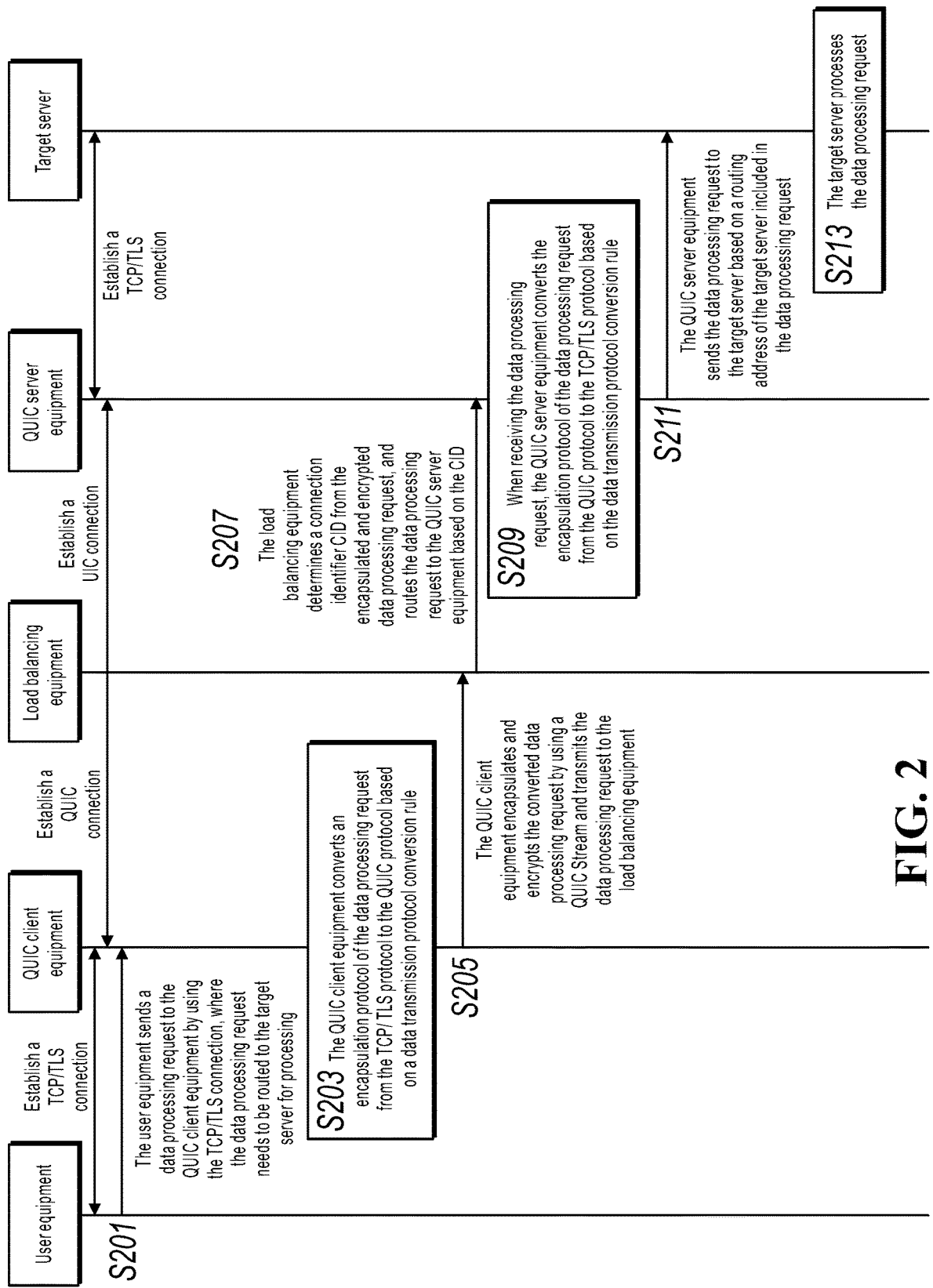
FIG. 2 is a schematic flowchart illustrating a data transmission method, according to an implementation of the present specification.

Based on the same inventive concept, FIG. 2 is a schematic flowchart illustrating a data transmission method, according to an implementation of the present specification. The data transmission method can be described as follows. Assume that this implementation of the present specification is executed by a data transmission network that supports the QUIC protocol, and the data transmission network includes a QUIC client equipment, a QUIC server equipment, and a load balancing equipment. The following describes in detail how to accelerate data transmission efficiency by using the data transmission network in a cross-border data transmission application scenario.

First, a TCP/TLS connection is established between a user equipment and the QUIC client equipment. A QUIC connection is established between the QUIC client equipment and the load balancing equipment. A QUIC connection is established between the load balancing equipment and the QUIC server. A TCP/TLS connection is established between the QUIC server and a target server.

Step 201: The user equipment sends a data processing request to the QUIC client equipment by using the TCP/TLS connection, where the data processing request needs to be routed to the target server for processing.

Step 203: The QUIC client equipment converts an encapsulation protocol of the data processing request from the TCP/TLS protocol to the QUIC protocol based on a data transmission protocol conversion rule.

Step 205: The QUIC client equipment encapsulates and encrypts the converted data processing request by using a QUIC Stream and transmits the data processing request to the load balancing equipment.

Step 207: The load balancing equipment determines a connection identifier CID from the encapsulated and encrypted data processing request, and routes the data processing request to the QUIC server equipment based on the CID.

It is worthwhile to note that in the implementation of the present specification, the load balancing equipment can implement load balancing of different QUIC server equipments based on the CID.

Step 209: When receiving the data processing request, the QUIC server equipment converts the encapsulation protocol of the data processing request from the QUIC protocol to the TCP/TLS protocol based on the data transmission protocol conversion rule.

Step 211: The QUIC server equipment sends the data processing request to the target server based on a routing address of the target server included in the data processing request.

Step 213: The target server processes the data processing request.

The target server sends an obtained processing result to the QUIC server, and the QUIC server performs data transmission protocol conversion and transmits the result to the QUIC client equipment by using the load balancing equipment. The QUIC client equipment also performs data transmission protocol conversion, and then transmits the result to the user equipment.

It is worthwhile to note that data transmission protocol conversion performed by the QUIC client equipment and data transmission protocol conversion performed by the QUIC server equipment are inverse to each other.

According to the technical solution provided in this implementation of the present specification, the data processing request sent by the first equipment deployed in the first region is received, where the data processing request is obtained through encapsulation by using the first data transmission protocol. The encapsulation protocol of the data processing request is converted from the first data transmission protocol to the second data transmission protocol based on different data transmission protocol conversion rules. The converted data processing request is transmitted by using the data transmission channel that supports the second data transmission protocol. An accelerated transmission mechanism is added to an existing data transmission mechanism. That is, for a data processing request transmitted by using a first encapsulation protocol, after data transmission protocol conversion is performed, transmission is performed by using a data transmission channel that supports a second encapsulation protocol, thereby effectively improving data transmission efficiency.

Figure 3:
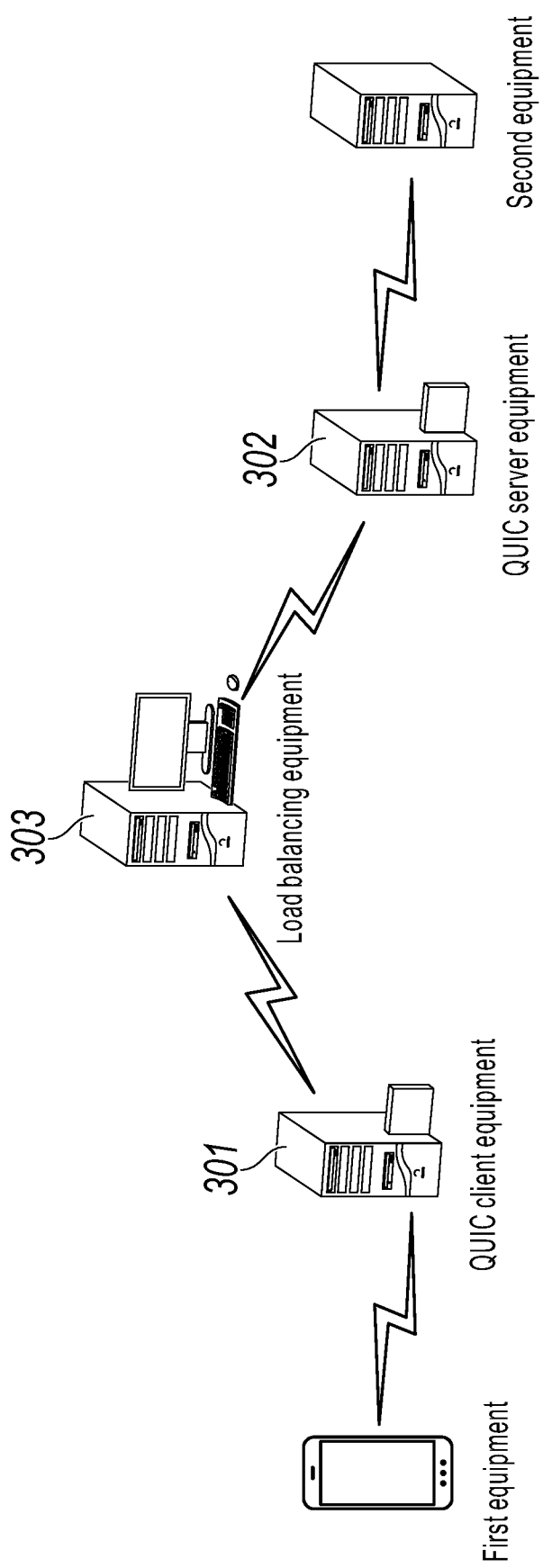
FIG. 3 is a schematic structural diagram illustrating a data transmission system, according to an implementation of the present specification.

Based on the same inventive concept, FIG. 3 is a schematic structural diagram illustrating a data transmission system, according to an implementation of the present specification. The data transmission system includes a QUIC client equipment 301 and a QUIC server equipment 302.

The QUIC client equipment 301 is deployed in a first region and configured to receive a data processing request sent by a first equipment deployed in the first region, where the data processing request is obtained through encapsulation by using a first data transmission protocol, and convert the encapsulation protocol of the data processing request from the first data transmission protocol to a second data transmission protocol based on different data transmission protocol conversion rules; and the QUIC server equipment 302 is deployed in a second region and configured to receive the converted data processing request by using a data transmission channel that is established with the QUIC client equipment and that supports the second data transmission protocol.

In another implementation of the present specification, the QUIC server equipment 302 converts the encapsulation protocol of the converted data processing request from the second data transmission protocol to the first data transmission protocol based on the different data transmission protocol conversion rules, and route the data processing request to a second equipment deployed in the second region, where the second equipment processes the data processing request.

In another implementation of the present specification, the data transmission system further includes a load balancing equipment 303.

The load balancing equipment 303 establishes a data transmission channel that supports the second data transmission protocol between the QUIC client equipment and the QUIC server equipment.

In another implementation of the present specification, the QUIC client equipment 301 encapsulates the data processing request based on the second data transmission protocol, so as to convert the encapsulation protocol of the data processing request from the first data transmission protocol to the second data transmission protocol.

In the data transmission system described in this implementation of the present specification, the QUIC client equipment and the QUIC server equipment are used as agents, and a small number of long connections are maintained between the QUIC client device and the QUIC server device, thereby effectively reducing a number of back-to-source long connections between cross-border sources, and increasing stability of the entire data transmission network.

Figure 4:
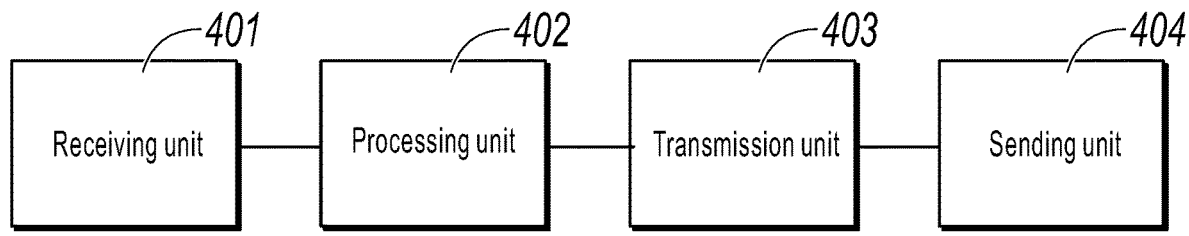
FIG. 4 is a schematic structural diagram illustrating a data transmission equipment, according to an implementation of the present specification.

Based on the same inventive concept, FIG. 4 is a schematic structural diagram illustrating a data transmission equipment, according to an implementation of the present specification. The data transmission equipment includes a receiving unit 401, a processing unit 402, and a transmission unit 403.

The receiving unit 401 is configured to receive a data processing request sent by a first equipment deployed in a first region, where the data processing request is obtained through encapsulation by using a first data transmission protocol; the processing unit 402 is configured to convert the encapsulation protocol of the data processing request from the first data transmission protocol to a second data transmission protocol based on different data transmission protocol conversion rules; and the transmission unit 403 is configured to transmit the converted data processing request by using a data transmission channel that supports the second data transmission protocol.

In another implementation of the present specification, the data transmission equipment further includes a sending unit 404.

The processing unit 402 is configured to convert the encapsulation protocol of the converted data processing request from the second data transmission protocol to the first data transmission protocol at an output end of the data transmission channel based on the different data transmission protocol conversion rules; and the sending unit 404 is configured to route the data processing request to a second equipment deployed in a second region, where the second equipment processes the data processing request.

In another implementation of the present specification, that the processing unit 402 is configured to convert the encapsulation protocol of the data processing request from the first data transmission protocol to a second data transmission protocol based on different data transmission protocol conversion rules includes: encapsulating the data processing request based on the second data transmission protocol, so as to convert the encapsulation protocol of the data processing request from the first data transmission protocol to the second data transmission protocol.

In another implementation of the present specification, the first data transmission protocol is the TCP/TLS protocol, and the second data transmission protocol is the QUIC protocol.

It is worthwhile to note that the data transmission equipment provided in this implementation of the present specification can be implemented by using software or hardware, which is not specifically limited here. The data transmission equipment receives the data processing request sent by the first equipment deployed in the first region, where the data processing request is obtained through encapsulation by using the first data transmission protocol; converts the encapsulation protocol of the data processing request from the first data transmission protocol to the second data transmission protocol based on different data transmission protocol conversion rules; and transmits the converted data processing request by using the data transmission channel that supports the second data transmission protocol. An accelerated transmission mechanism is added to an existing data transmission mechanism. That is, for a data processing request transmitted by using a first encapsulation protocol, after data transmission protocol conversion is performed, transmission is performed by using a data transmission channel that supports a second encapsulation protocol, thereby effectively improving data transmission efficiency.

In addition, with reference to the data processing method in the previous implementation, an implementation of the present specification can provide a computer readable storage medium for implementation. The computer readable storage medium stores computer program instructions. When the computer program instructions are executed by a processor, any data transmission method in the previous implementation is implemented.

Figure 5:
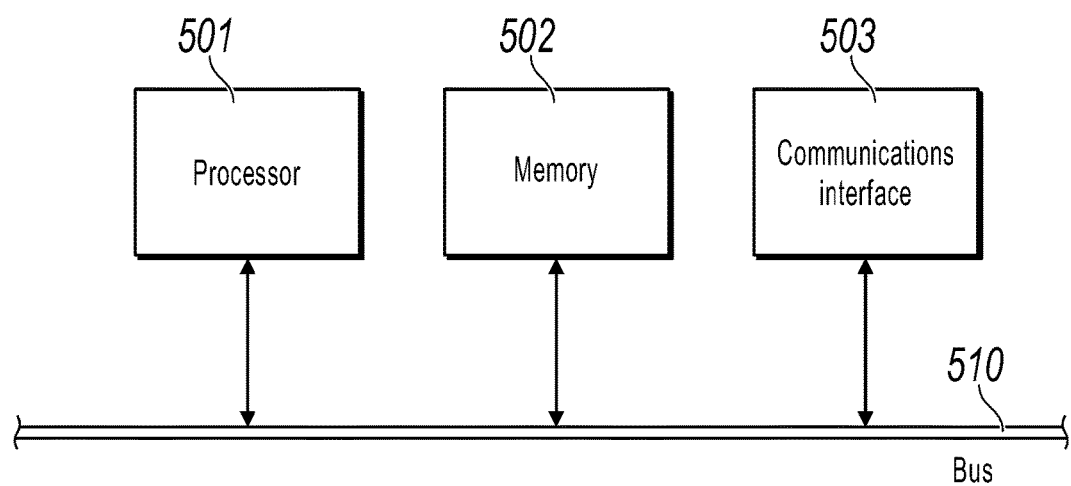
FIG. 5 is a schematic structural diagram illustrating a data transmission equipment, according to an implementation of the present specification.

FIG. 5 is a schematic structural diagram illustrating hardware of a data transmission equipment, according to an implementation of the present specification.

The data transmission equipment can include a processor 501 and a memory 502 that stores computer program instructions.

Specifically, the processor 501 can include a central processing unit (CPU), an application-specific integrated circuit (ASIC), or can be configured as one or more integrated circuits for implementing this implementation of the present specification.

The memory 502 can include a large-capacity memory used for data or instructions. By way of example instead of limitation, the memory 502 can include a hard disk drive (HDD), a floppy drive, a flash memory, an optical disc, a magnetic disc, a magnetic tape, a universal serial bus (USB) drive, or a combination thereof. In appropriate cases, the memory 502 can include a removable or non-removable (or fixed) medium. In appropriate cases, the memory 502 can be inside or outside a data processing device. In a particular implementation, the memory 502 is a non-volatile solid-state memory. In a particular implementation, the memory 502 includes a read-only memory (ROM). In appropriate cases, the ROM can be a mask programmed ROM, a programmable ROM (PROM), an erasable PROM (EPROM), an electrically erasable PROM (EEPROM), an electrically alterable ROM (EAROM), a flash memory, or a combination thereof.

The processor 501 reads and executes the computer program instructions stored in the memory 502, so as to implement any data processing method in the previous implementation.

In an example, the data transmission equipment can further include a communications interface 503 and a bus 510. As shown in FIG. 5, the processor 501, the memory 502, and the communications interface 503 are connected and complete mutual communication by using the bus 510.

The communications interface 503 is mainly configured to implement communication between modules, devices, units, and/or devices in the implementation of the present specification.

The bus 510 includes hardware, software, or both, and couples components of a signaling data transmission equipment together. By way of example instead of limitation, the bus can include an accelerated graphics port (AGP) or another graphics bus, an enhanced industrial standard architecture (EISA) bus, a front side bus (FSB), a hyper transport (HT) interconnection, an industrial standard architecture (ISA) bus, an infinite bandwidth interconnection, a low pin count (LPC) bus, a memory bus, a micro channel architecture (MCA) bus, a peripheral component interconnection (PCI) bus, a PCI-Express (PCI-X) bus, a serial advanced technology attachment (SATA) bus, a VESA local bus (VLB), another suitable bus, or a combination thereof. In appropriate cases, the bus 510 can include one or more buses. Although implementations of the present specification describe and illustrate specific buses, the present specification considers any suitable bus or interconnection.

According to the data transmission method and device provided in the implementations of the present specification, a data processing request sent by a first equipment deployed in a first region is received, where the data processing request is obtained through encapsulation by using a first data transmission protocol. The encapsulation protocol of the data processing request is converted from the first data transmission protocol to a second data transmission protocol based on different data transmission protocol conversion rules. The converted data processing request is transmitted by using a data transmission channel that supports the second data transmission protocol. An accelerated transmission mechanism is added to an existing data transmission mechanism. That is, for a data processing request transmitted by using a first encapsulation protocol, after data transmission protocol conversion is performed, transmission is performed by using a data transmission channel that supports a second encapsulation protocol, thereby effectively improving data transmission efficiency.

In the 1990$s$, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that an implementation of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data transmission device to generate a machine, so the instructions executed by the computer or the processor of the another programmable data transmission device generate a device for implementing a specific function in one or more processes in the flowcharts and/or in one or more blocks in the block diagrams.

These computer program instructions can be stored in a computer readable memory that can instruct the computer or the another programmable data transmission device to work in a specific way, so the instructions stored in the computer readable memory generate an artifact that includes an instruction device. The instruction device implements a specified function in one or more processes in the flowcharts and/or in one or more blocks in the block diagrams.

These computer program instructions can be loaded onto the computer or another programmable data transmission device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more central processing units (CPUs), one or more input/output interfaces, one or more network interfaces, and one or more memories.

The memory can include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous implementations are only implementations of the present specification, and are not intended to limit the present specification. A person skilled in the art can make various modifications and changes to the present specification. Any modification, equivalent replacement, or improvement made without departing from the spirit and principle of the present specification shall fall within the scope of the claims in the present specification.

What is claimed is:

1. A computer-implemented data transmission method, comprising:
    receiving, by a data transmission system, a data processing request sent by a first client deployed in a first region, wherein the data processing request is encapsulated using a first data transmission protocol;
    converting an encapsulation protocol of the data processing request from the first data transmission protocol to a second data transmission protocol, to obtain a converted data processing request;
    transmitting the converted data processing request using a data transmission channel of the data transmission system, wherein the data transmission channel supports the second data transmission protocol;
    at an output end of the data transmission channel, converting the encapsulation protocol of the converted data processing request from the second data transmission protocol to the first data transmission protocol, to obtain the data processing request; and
    transmitting the data processing request to a second client deployed in a second region.

2. The computer-implemented method of claim 1, wherein the first data transmission protocol is a transmission control protocol/transport layer security (TCP/TLS) protocol, and wherein the second data transmission protocol is a Quick UDP Internet Connections (QUIC) protocol.

3. The computer-implemented method of claim 2, wherein receiving the data processing request sent by the first client comprises:
    receiving the data processing request using a QUIC client device deployed in the first region;
    and wherein converting the encapsulation protocol of the converted data processing request comprises:
    receiving the converted data processing request using a QUIC server device deployed in the second region, and converting the encapsulation protocol of the converted data processing request using the QUIC server device.

4. The computer-implemented method of claim 3, further comprising:
    establishing the data transmission channel between the QUIC client device and the QUIC server device using a load balancing device of the data transmission system.

5. The computer-implemented method of claim 1, wherein the data transmission channel comprises a Quick UDP Internet Connections (QUIC) stream.

6. The computer-implemented method of claim 1, wherein the data transmission channel comprises a cross-border long channel.

7. A non-transitory, computer-readable medium storing one or more instructions executable by a computer system to perform operations comprising:
    receiving, by a data transmission system, a data processing request sent by a first client deployed in a first region, wherein the data processing request is encapsulated using a first data transmission protocol;
    converting an encapsulation protocol of the data processing request from the first data transmission protocol to a second data transmission protocol, to obtain a converted data processing request;
    transmitting the converted data processing request using a data transmission channel of the data transmission system, wherein the data transmission channel supports the second data transmission protocol;
    at an output end of the data transmission channel, converting the encapsulation protocol of the converted data processing request from the second data transmission protocol to the first data transmission protocol, to obtain the data processing request; and
    transmitting the data processing request to a second client deployed in a second region.

8. The computer-readable medium of claim 7, wherein the first data transmission protocol is a transmission control protocol/transport layer security (TCP/TLS) protocol, and wherein the second data transmission protocol is a Quick UDP Internet Connections (QUIC) protocol.

9. The computer-readable medium of claim 8, wherein receiving the data processing request sent by the first client comprises:
    receiving the data processing request using a QUIC client device deployed in the first region;
    and wherein converting the encapsulation protocol of the converted data processing request comprises:
    receiving the converted data processing request using a QUIC server device deployed in the second region, and converting the encapsulation protocol of the converted data processing request using the QUIC server device.

10. The computer-readable medium of claim 9, wherein the operations further comprise:
establishing the data transmission channel between the QUIC client device and the QUIC server device using a load balancing device of the data transmission system.

11. The computer-readable medium of claim 7, wherein the data transmission channel comprises a Quick UDP Internet Connections (QUIC) stream.

12. The computer-readable medium of claim 7, wherein the data transmission channel comprises a cross-border long channel.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a data transmission system, a data processing request sent by a first client deployed in a first region, wherein the data processing request is encapsulated using a first data transmission protocol;
converting an encapsulation protocol of the data processing request from the first data transmission protocol to a second data transmission protocol, to obtain a converted data processing request;
transmitting the converted data processing request using a data transmission channel of the data transmission system, wherein the data transmission channel supports the second data transmission protocol;
at an output end of the data transmission channel, converting the encapsulation protocol of the converted data processing request from the second data transmission protocol to the first data transmission protocol, to obtain the data processing request; and
transmitting the data processing request to a second client deployed in a second region.

14. The computer-implemented system of claim 13, wherein the first data transmission protocol is a transmission control protocol/transport layer security (TCP/TLS) protocol, and wherein the second data transmission protocol is a Quick UDP Internet Connections (QUIC) protocol.

15. The computer-implemented system of claim 14, wherein receiving the data processing request sent by the first client comprises:
receiving the data processing request using a QUIC client device deployed in the first region;
and wherein converting the encapsulation protocol of the converted data processing request comprises:
receiving the converted data processing request using a QUIC server device deployed in the second region, and converting the encapsulation protocol of the converted data processing request using the QUIC server device.

16. The computer-implemented system of claim 15, wherein the operations further comprise:
establishing the data transmission channel between the QUIC client device and the QUIC server device using a load balancing device of the data transmission system.

17. The computer-implemented system of claim 13, wherein the data transmission channel comprises a Quick UDP Internet Connections (QUIC) stream.

18. The computer-implemented system of claim 13, wherein the data transmission channel comprises a cross-border long channel.

* * * * *